April 19, 1932.  F. D. LOVETTE  1,855,063

MANICURING IMPLEMENT

Filed Oct. 16, 1931

INVENTOR
F.D.Lovette
BY A.D.Adams
ATTORNEY

Patented Apr. 19, 1932

1,855,063

UNITED STATES PATENT OFFICE

FRANK D. LOVETTE, OF ATLANTA, GEORGIA

MANICURING IMPLEMENT

Application filed October 16, 1931. Serial No. 569,311.

This invention relates to manicuring implements and, among other objects, aims to provide an improved cutting tool having novel means to produce a smooth, rounded finish on the finger nails so as to avoid the necessity of using a nail file.

Other aims and advantages of the invention will appear in the specification, when considered in connection with the accompanying drawings, wherein.

Referring particularly to the drawings, the type of implement there shown comprises a double-edged knife or cutter adapted to be pushed down on a nail and cut it in both directions of movement. While the cutter may be made in many different forms, it is shown as having a metal shank 10 suitably mounted in a handle 11 which may be knurled or otherwise roughened to provide a suitable grip. The handle may be of any desired shape and any ornamentation may be applied to it.

Figure 4:
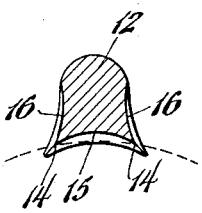
Fig. 4 is an enlarged sectional view taken on the line 4—4 of Fig. 1.
Figure 5:
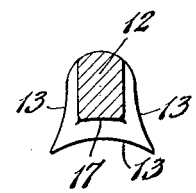
Fig. 5 is an enlarged sectional view taken on the line 5—5 of Fig. 1.
Figure 6:
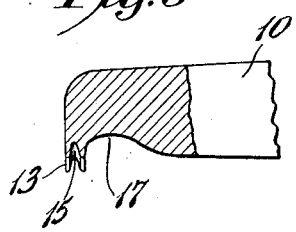
Fig. 6 is a sectional view taken on the line 6—6 of Fig. 3.

The shank has an enlarged head 12 which may be formed by forging, die casting or the like and presents a flange 13 substantially at right angles to the axis of the cutter. In this example the lower end of the flange is arcuate and presents cutting edges or blades 14 on opposite sides. To guide the cutting edges over the nail, an arcuate groove 15 is formed between the cutting edges and the radius of curvature is less than that of a nail to be cut providing adequate clearance as clearly shown in Fig. 4. Furthermore, the opposite side edges of the flange or cutting head have rounded grooves 16 so that the cutting edges are rounded in planes at right angles to the bottom groove. As will be noted in Fig. 1, the groove in the cutter guides the cutting edges to oscillate on the nail and to cut the nail as the head is moved in both directions. The thickness of the inner guide flange formed by the bottom groove is such that it may be inserted between the nail and the finger tip.

To guide the cutting head properly on the nail, it is shown as having a concave surface 17 formed on the shank adjacent to the head and so shaped as to conform substantially to the contour of a finger tip of ordinary size. Of course, it will be understood that implements of this type will be made of different sizes.

Figure 1:
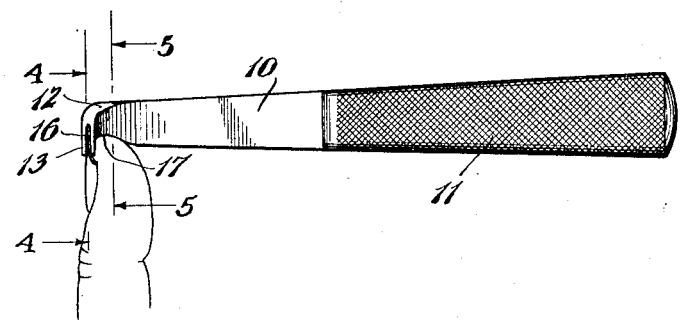
Fig. 1 is a side elevation of one form of cutting implement embodying the invention.
Figure 2:
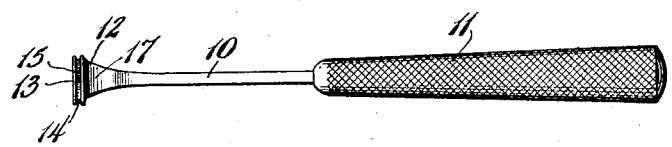
Fig. 2 is a bottom plan view.
Figure 3:
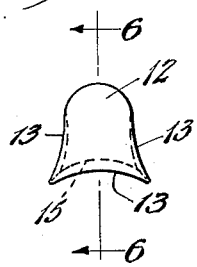
Fig. 3 is an end view on an enlarged scale.

To use the tool, it is placed on a finger as shown in Fig. 1 and pushed across the nail until it has cut off as much of the nail as is desired. In some instances, however, it is contemplated that the head may be held stationary while the finger moved to produce the same result. The concave guiding surface 17 contacts with the finger tip and prevents the cutting edges from cutting gaps or niches in the nail. By virtue of the rounded cutting edges, the nail is always rounded in cross section so that it presents no sharp or ragged edges such as are left by ordinary scissors, knives or some manicuring implements. This obviates the necessity of using a nail file or other manicuring implement to finish the edges of the nails. That is to say, the improved implement serves the double purpose of cutting and smoothing the nails. The double edges enable the implement to be manipulated by either hand of the user.

While the implement is described as a manicuring tool, it will be understood that it is also applicable to toe nails and may be used in the same manner.

Obviously, the present invention is not restricted to the particular embodiment thereof herein shown and described.

What is claimed is:

1. A manicuring implement of the character described comprising a head having oppositely disposed, outwardly diverging cutting edges both adapted to engage and be oscillated on a nail; and means to guide the cutter on the nail.

2. A manicuring implement of the class described comprising a head having a groove therein, cutting edges at the outer ends of the groove adapted to engage a finger or toe nail, said head having a separated guiding surface adapted to engage the tip of the digit.

3. A manicuring implement of the character described comprising, in combination, a shank having a handle; a cutter head on the shank presenting a flange extending substantially at right angles thereto; an arcuate groove formed in the lower edge of the flange the side edges of said flange having rounded grooves forming curved cutting edges adjacent to the opposite ends of said arcuate groove in the lower edge so as to contact with and cut an edge rounded in cross section on the nail; and said shank having a concave surface adjacent to said flange to conform substantially to the contour of the tip of the digit and being guided thereby during the movement of the implement.

4. An implement of the class described comprising a head having a pair of spaced outwardly diverging and curved cutting edges; and said head having a groove between the cutting edges to guide the cutting edges on a nail.

In testimony, that I claim the foregoing as my own, I have hereto affixed my signature.

FRANK D. LOVETTE.